US011763685B2

(12) United States Patent
Plantinga et al.

(10) Patent No.: US 11,763,685 B2
(45) Date of Patent: Sep. 19, 2023

(54) DIRECTING AND COMMUNICATING DATA TO A FLIGHT MANAGEMENT SYSTEM

(71) Applicant: GE Aviation Systems LLC, Grand Rapids, MI (US)

(72) Inventors: Jeffrey M. Plantinga, Grand Rapids, MI (US); Ralph Demmon Boozer, Rockford, MI (US); Benjamin Ivan Coutts, Rockford, MI (US)

(73) Assignee: GE Aviation Systems LLC, Grand Rapids, MI (US)

( * ) Notice: Subject to any disclaimer, the term of this patent is extended or adjusted under 35 U.S.C. 154(b) by 447 days.

(21) Appl. No.: 16/804,432

(22) Filed: Feb. 28, 2020

(65) Prior Publication Data

US 2021/0272464 A1 Sep. 2, 2021

(51) Int. Cl.
*G08G 5/00* (2006.01)
*H04B 7/185* (2006.01)
*H04B 17/26* (2015.01)
*G06Q 50/30* (2012.01)

(52) U.S. Cl.
CPC ............ *G08G 5/003* (2013.01); *G06Q 50/30* (2013.01); *G08G 5/0013* (2013.01); *G08G 5/0021* (2013.01); *H04B 7/18506* (2013.01); *H04B 17/26* (2015.01)

(58) Field of Classification Search
CPC .... G08G 5/003; G08G 5/0013; G08G 5/0021; G06Q 50/30; H04B 7/18506; H04B 17/26; G06F 16/2282; G06F 16/23
See application file for complete search history.

(56) References Cited

U.S. PATENT DOCUMENTS

| | | | |
|---|---|---|---|
| 4,943,919 A | 7/1990 | Aslin et al. | |
| 6,278,913 B1 | 8/2001 | Jiang | |
| 7,196,638 B2 | 3/2007 | Sabatino | |
| 7,203,630 B2 | 4/2007 | Kolb et al. | |
| 7,612,716 B2 | 11/2009 | Smith et al. | |
| 7,640,082 B2 | 12/2009 | Dwyer | |
| 8,170,988 B2 | 5/2012 | Yukawa et al. | |
| 8,255,516 B1 | 8/2012 | Zhang et al. | |
| 8,543,258 B2 | 9/2013 | Halvorson et al. | |
| 9,014,098 B2 | 4/2015 | Jacobs | |
| 9,426,650 B2 | 8/2016 | Bangole et al. | |

(Continued)

FOREIGN PATENT DOCUMENTS

| | | | | |
|---|---|---|---|---|
| CN | 106777310 A | * | 5/2017 | .............. G06F 11/07 |
| EP | 3564925 A1 | | 11/2019 | |

OTHER PUBLICATIONS

English Translation CN 106777310 A (Year: 2017).*

*Primary Examiner* — Ian N Moore
*Assistant Examiner* — Sun Jong Kim
(74) *Attorney, Agent, or Firm* — McGarry Bair PC

(57) ABSTRACT

A system and method for compiling and converting Aeronautical Radio Incorporated (ARINC) 424 or Digital Aeronautical Flight Information File (DAFIF) files into a binary database. The system and method include a controller module for receiving, extracting, converting, performing a set of quality checks, and directing the output or communication of the binary database to a remote server. The remote server can include a controller module that can verify validity of the communicated binary database and create aircraft loadable media for a flight management system navigational database.

17 Claims, 10 Drawing Sheets

(56) References Cited

U.S. PATENT DOCUMENTS

| | | |
|---|---|---|
| 9,529,851 B1 | 12/2016 | Smith |
| 9,567,099 B2 | 2/2017 | Poux et al. |
| 9,824,118 B2 | 11/2017 | Tabb et al. |
| 10,057,243 B1 | 8/2018 | Kumar et al. |
| 10,068,488 B2 | 9/2018 | Ramaker et al. |
| 10,074,283 B1 | 9/2018 | de Oliveira et al. |
| 10,154,096 B2 | 12/2018 | Coulmeau et al. |
| 10,162,969 B2 | 12/2018 | Knapp |
| 10,331,658 B2 | 6/2019 | Pennefather et al. |
| 10,469,480 B2 | 11/2019 | Kumar et al. |
| 10,497,268 B2 | 12/2019 | Rab et al. |
| 10,503,574 B1 | 12/2019 | Lisuk et al. |
| 10,521,979 B2 | 12/2019 | Clark, IV et al. |
| 2003/0179315 A1* | 9/2003 | Collins ............... H04N 21/435 348/461 |
| 2004/0217228 A1 | 11/2004 | Scozzafava |
| 2005/0031214 A1* | 2/2005 | Zhang ............... H04N 19/597 382/284 |
| 2005/0108631 A1 | 5/2005 | Amorin et al. |
| 2010/0005102 A1 | 1/2010 | Stefani |
| 2012/0304154 A1* | 11/2012 | Cabillic ............... G06F 8/20 717/124 |
| 2013/0051634 A1* | 2/2013 | Mirski-Fitton .... G06V 30/1423 382/314 |
| 2014/0245454 A1* | 8/2014 | Lee ............... G06F 11/08 726/26 |
| 2015/0188633 A1* | 7/2015 | Liu ............... H04W 12/47 398/118 |
| 2015/0256206 A1* | 9/2015 | Nakagata ............... H04L 1/0047 714/759 |
| 2016/0111007 A1 | 4/2016 | Dennerline |
| 2016/0267157 A1 | 9/2016 | Mutschler et al. |
| 2016/0328978 A1* | 11/2016 | Ramaker ............... G08G 5/0021 |
| 2017/0236425 A1 | 8/2017 | Ballestros et al. |
| 2018/0174473 A1* | 6/2018 | Quiroz-Hernandez ................... G01C 21/20 |
| 2019/0016477 A1 | 1/2019 | Demirel |
| 2019/0107815 A1 | 4/2019 | Miller et al. |
| 2019/0173971 A1* | 6/2019 | Na ............... H04W 4/70 |
| 2019/0312935 A1 | 10/2019 | Selvarajan et al. |
| 2019/0369979 A1 | 12/2019 | Woods et al. |
| 2020/0379956 A1* | 12/2020 | Mendo Hernandez ................... G06F 16/13 |

* cited by examiner

DIRECTING AND COMMUNICATING DATA TO A FLIGHT MANAGEMENT SYSTEM

TECHNICAL FIELD

The present disclosure generally relates to a method of facilitating data communication between an original data source and a flight management system (FMS).

BACKGROUND

A variety of aircraft data is available for use on an aircraft. Data relevant to a flight can be available from a number of aviation data sources. For example, an aircraft's navigation system e.g., Flight Management System (FMS), currently stores several databases. A database used for flight planning, navigation, and trajectory prediction is the Navigation Database (NDB), which is stored in the FMS. The NDB is a static database that is updated per the 28-day Aeronautical Information Regulation and Control (AIRAC) cycle. Currently, maintenance personnel are required to manually update the NDB on this cycle. The NDB is used to ensure that, for instance, planned closures of runways or navigational aids get reflected so that the flight crew or the FMS cannot select them during the predetermined time period between update cycles.

BRIEF DESCRIPTION

In one aspect, the disclosure relates to a method for facilitating data communication that includes receiving, with a controller module, incoming data related to operation of an aircraft, extracting, with the controller module, a subset of the incoming data based on a set of predetermined parameters, converting, with the controller module, the subset of the incoming data to binary data according to a binary format and including a digital signature on the binary data, performing, with the controller module, a set of quality checks on the binary data according to the binary format and wherein at least one of the set of quality checks includes automatically determining if the digital signature is satisfied, and directing, the output of communication of the binary data.

In another aspect, the disclosure relates to a system for compiling and converting Aeronautical Radio Incorporated (ARINC) 424 or Digital Aeronautical Flight Information File (DAFIF) files into a binary database that includes a controller module configured to receive incoming data in Aeronautical Radio Incorporated (ARINC) 424 format or Digital Aeronautical Flight Information File (DAFIF) format, extract a subset of the incoming data based on a set of predetermined parameters, convert the subset of the incoming data to binary data according to a binary format and including a digital signature on the binary data, perform a set of quality checks on the binary data according to the binary format and wherein at least one of the set of quality checks includes automatically determining if the digital signature is satisfied, and direct the output of communication of the binary data.

DETAILED DESCRIPTION

Figure 1:
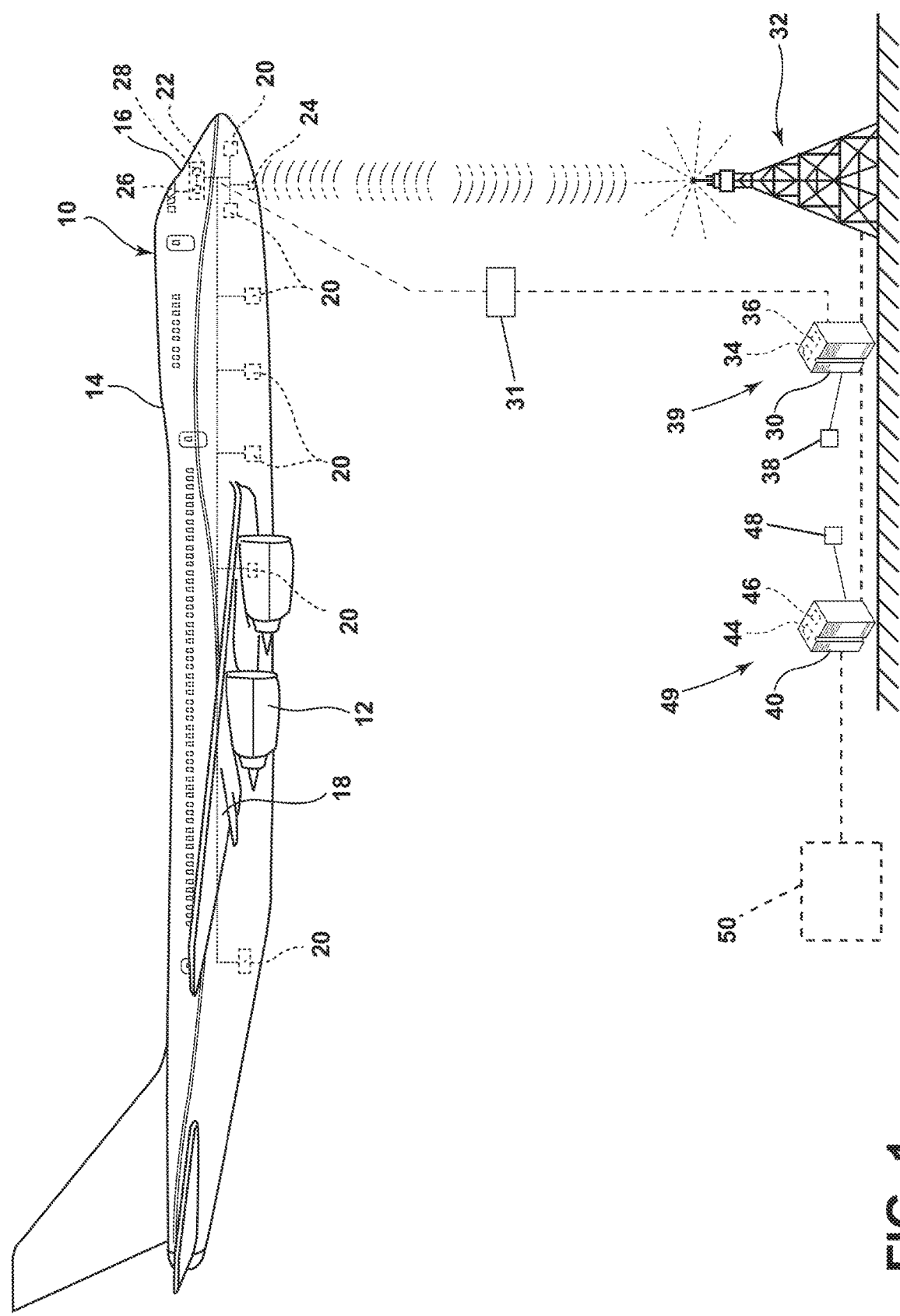
FIG. 1 is a schematic illustration of an aircraft and ground system, in accordance with various aspects described herein.

A variety of aircraft data is available for use on an aircraft. Data relevant to a flight can be available from a number of aviation data sources. The data may be organized in various formats used for aviation data, for example, in accordance with the Aeronautical Radio Incorporated (ARINC) 424 standard for aircraft navigation data, or in the Digital Aeronautical Flight Information File (DAFIF) format managed by the National Geospatial-Intelligence Agency (NGA).

An aircraft's navigation system, which may be referred to as its Flight Management System (FMS), stores several databases. A static database used for flight planning and trajectory prediction is the Navigation Database (NDB), which is stored in the FMS and can be updated by the various sources of aviation data, each in its respective aviation data format.

Communication of the aviation data to the FMS NDB can encounter several challenges. For example, the data in the ARINC 424 or DAFIF format can be incomplete such that the formats omit certain desired information. Another challenge is that a particular FMS NDB may not require all of the aviation data that is specified in the ARINC 424 file or DAFIF formats.

For the aviation data provided in the ARINC 424 or DAFIF format to be used by the FMS NDB, it must be converted to a binary file format (i.e., binary standard) that can be processed by the FMS NDB. Several errors or verification issues can arise during the conversion from ARINC 424 or DAFIF format to the binary format.

For purposes of illustration and discussion, the present disclosure will be described with respect to a navigational database for an aircraft. It will be understood that the disclosure can have applicability in other vehicles or systems, and can be used to provide benefits in industrial, commercial, and residential applications that use or require data including navigational data. The disclosure will also refer to specific formats for aviation data, although the principles described would translate equally to any aviation data format that can be converted and loaded to an FMS. The term "aviation data" refers to any data relevant to operation of an aircraft, including but not limited to, navigation data, aircraft health data, environmental data, or event data.

The aspects of the present disclosure are directed to a system and method for facilitating data communication. The data communication can begin with receiving incoming data, such as navigational data. A subset of the navigational data is extracted based on predetermined parameters. The extracted subset of navigational data can then be converted to binary data that adheres to a binary standard. One or more quality checks can be performed on the binary data and the binary data can be communicated or output to an appropriate receiving node.

By way of non-limiting example, the appropriate receiving node includes at least one controller module that can receive the binary data as a set of navigational databases. Each navigational database of the set of navigational databases can be verified by the controller module. Upon verification, the set of navigational databases can be used to create aircraft loadable media.

Optionally, a check against previously received and verified set of navigational databases allows the controller to determine duplicate information or establish a determination of sameness or differentness between the fields, records, or data in each of the set of navigational databases. Once reconciled or reviewed, the set of navigational databases can be used to create aircraft loadable media or a reference database. The aircraft loadable media can be used to update the FMS NDB of an aircraft.

As used herein, the term "set" or a "set" of elements can be any number of elements, including only one. The term "subset" refers to all or a portion of a set. Additionally, as used herein, a "controller" or "controller module" can include a component configured or adapted to provide instruction, control, operation, or any form of communication for operable components to affect the operation thereof. A controller module can include any known controller module, processor, microcontroller, or logic device, including, but not limited to: field programmable gate arrays (FPGA), an application specific integrated circuit (ASIC), a full authority digital engine control (FADEC), a proportional controller (P), a proportional integral controller (PI), a proportional derivative controller (PD), a proportional integral derivative controller (PID controller), a hardware-accelerated logic controller (e.g. for encoding, decoding, transcoding, etc.), the like, or a combination thereof. Non-limiting examples of a controller module can be configured or adapted to run, operate, or otherwise execute program code to effect operational or functional outcomes, including carrying out various methods, functionality, processing tasks, calculations, comparisons, sensing or measuring of values, or the like, to enable or achieve the technical operations or operations described herein. The operation or functional outcomes can be based on one or more inputs, stored data values, sensed or measured values, true or false indications, or the like. While "program code" is described, non-limiting examples of operable or executable instruction sets can include routines, programs, objects, components, data structures, algorithms, etc., that have the technical effect of performing particular tasks or implementing particular abstract data types. In another non-limiting example, a controller module can also include a data storage component accessible by the controller module or processor, including memory, whether transient, volatile or non-transient, or non-volatile memory. Additional non-limiting examples of the memory can include Random Access Memory (RAM), Read-Only Memory (ROM), flash memory, or one or more different types of portable electronic memory, such as discs, DVDs, CD-ROMs, flash drives, universal serial bus (USB) drives, the like, or any suitable combination of these types of memory. In one example, the program code can be stored within the memory in a machine-readable format accessible by the controller module or the processor. Additionally, the memory can store various data, data types, sensed or measured data values, inputs, generated or processed data, or the like, accessible by the controller module or the processor in providing instruction, control, or operation to affect a functional or operable outcome, as described herein.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are used only for identification purposes to aid the reader's understanding of the present disclosure, and should not be construed as limiting aspects of the disclosure, particularly as to the position, orientation, or use of aspects of the disclosure described herein. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

FIG. 1 depicts an aircraft 10 that provides an environment for different aspects of the disclosure. The aircraft 10 can fly a route from one location to another and can include one or more propulsion engines 12 coupled to a fuselage 14. A cockpit 16 can be positioned in the fuselage 14 and wing assemblies 18 can extend outwardly from the fuselage 14. Further, a set of aircraft systems 20 that enable proper operation of the aircraft 10 can be included as well as a controller or computer 22, and a communication system having a communication link 24.

The set of aircraft systems 20 can reside within the cockpit 16, within the electronics and equipment bay (not shown), as well as in other locations throughout the aircraft 10 including that they can be associated with the engines 12. Such aircraft systems 20 can include but are not limited to an electrical system, an oxygen system, hydraulics or pneumatics system, a fuel system, a propulsion system, FMS, flight controls, audio/video systems, an Integrated Vehicle Health Management (IVHM) system, and systems associated with the mechanical structure of the aircraft 10.

The computer 22 can be operably coupled to the set of aircraft systems 20 and it is contemplated that the computer 22 can aid in operating the set of aircraft systems 20 and can receive information from the set of aircraft systems 20. The computer 22 can, among other things, automate the tasks of piloting and tracking the flight plan of the aircraft 10. The computer 22 can also be connected with other controllers or computers of the aircraft 10.

The computer 22 can include memory 26, the memory 26 can include Random Access Memory (RAM), Read-Only Memory (ROM), flash memory, or one or more different types of portable electronic memory, such as discs, Digital Versatile disks (DVD), Compact Disc-Read-Only Memory (CD-ROMs), etc., or any suitable combination of these types of memory. The computer 22 can include one or more controller modules or processors 28, which can be running any suitable programs. It will be understood that the computer 22 can include or be associated with any suitable number of individual microprocessors, power supplies, storage devices, interface cards, auto flight systems, flight management computers, controller modules, and other standard components and that the computer 22 can include or cooperate with machine executable code, any number of software programs (e.g., flight management programs), or other instructions designed to carry out the various methods, process tasks, calculations, and control/display functions necessary for operation of the aircraft 10.

The communication link 24 can be communicably coupled to the computer 22 or other control modules or processors of the aircraft to transfer information to and from the aircraft 10. It is contemplated that the communication link 24 can be a wireless communication link and can be any variety of communication mechanism capable of wirelessly linking with other systems and devices and can include, but is not limited to, satellite uplink, satellite communications (SATCOM) internet, very high frequency (VHF) Data Link (VDL), ACARS network, Automatic Dependent Surveillance-Broadcast (ADS-B), Wireless Fidelity (WiFi), WiMax, 3G wireless signal, Code Division Multiple Access (CDMA) wireless signal, Global System for Mobile communication (GSM), 4G wireless signal, Long Term Evolution (LTE) signal, 5G wireless signal or any combinations thereof. It will also be understood that the particular type or mode of wireless communication is not critical to the disclosure, and later-developed wireless networks are certainly contemplated as within the scope of the current disclosure. Further, the communication link 24 can be communicably coupled with the computer 22 through a wired link without changing the scope of the aspects of this disclosure. Although only one communication link 24 has been illustrated, it is contemplated that the aircraft 10 can have multiple communication links communicably coupled with the computer 22. Such multiple communication links can provide the aircraft 10 with the ability to transfer information to or from the aircraft 10 in a variety of ways.

As illustrated, the computer 22 can communicate with a first remote server 30, which can be located anywhere. The communication between the first remote server 30 and the computer 22 can be via an external data storage device 31. Non-limiting examples of the external data storage device 31 can include, but is not limited to, hard drives, floppy disks, laptops, Universal Serial Bus (USB) drives, jump drives, mobile devices, CDs, storage arrays, or DVDs.

Additionally, or alternatively, the computer 22 can communicate with a first remote server 30 located at or communicatively coupled to a designated ground station 32. Communication can be sent or received between the ground station 32 and the computer 22 via the communication link 24. The ground station 32 can be any type of communicating ground station 32 such as one operated by an Air Navigation Service Provider (ANSP)/Air Traffic Control (ATC).

A second remote server 40 can be in communication with the first remote server 30 or the ground station 32. The second remote server 40 can communicate with the first remote server 30 using any suitable wired or wireless communication link. While illustrated as the second remote server 40, any number of remote servers can be in communication with the first remote server 30.

The first and second remote servers 30, 40 can include a first set of computer searchable databases 34 and a second set of computer searchable databases 44, respectively. The first and second computer searchable databases 34, 44 can be accessible by a first controller module 36 and a second controller module 46. The first and second controller modules 36, 46 can run a set of executable instructions to access the first and second computer searchable databases of information 34, 44. The first and second remote servers 30, 40 might include a general-purpose computing device in the form of a computer, including a processing unit, a system memory, and a system bus, that couples various system components including the system memory to the processing unit. The system memory can include ROM and RAM. The computer can also include a magnetic hard disk drive for reading from and writing to a magnetic hard disk, a magnetic disk drive for reading from or writing to a removable magnetic disk, and an optical disk drive for reading from or writing to a removable optical disk such as a CD-ROM or other optical media. It will be understood that the first and second computer searchable databases of information 34, 44 can be any suitable database, including a single database having multiple sets of data, multiple discrete databases linked together, or even a simple table of data. It is contemplated that the computer searchable databases of information 34, 44 can incorporate a number of databases or that the database can actually be a number of separate databases.

A first user interface is illustrated, by way of non-limiting example, as a first display 38 that is communicatively coupled to or formed with the first remote server 30. The first display 38 can be any user interface, screen, or known computer system or combination or computer systems that can communicate or otherwise provide an output to one or more users of the first remote server 30. It is contemplated that the first display 38 can also obtain or receive input from the one or more users of the first remote server 30.

A second user interface is illustrated, by way of non-limiting example, as a second display 48 that is communicatively coupled to or formed with the second remote server 40. The second display 48 can be any user interface, screen, or known computer system or combination or computer systems that can communicate or otherwise provide an output to one or more users of the second remote server 40. It is contemplated that the second display 48 can also obtain or receive input from the one or more users of the second remote server 40.

A first system 39 that is adapted to interact with a navigation database can be defined by the first remote server 30 or the first controller module 36. For example, the first system can define a comparison system that can identify changes and differences between a plurality of navigation databases. Among other things the first controller module 36 can display the comparison of Navigation Databases, loadable media, structured query language (SQL) or SQLite export files, and Gold Standard Databases. The first controller module 36 can determine, calculate, or display change statistics and display all differences with an intuitive side-by-side comparison. The comparison results can also be filtered and refined to highlight specific aspects. The comparison results can be displayed on the first display 38. The first display 38 can show indications of sameness or differentness allowing the user to update or amend the reference database. A second system 49 for compiling and converting aviation data, e.g., Aeronautical Radio Incorporated (ARINC) 424 or Digital Aeronautical Flight Information File (DAFIF) files, into a binary file format can be defined by the second remote server 40 or the second controller module 46.

It is contemplated that the first system 39 and the second system 49 are housed on the same server. That is, the first and second servers 30, 40 can be a single server, where a single controller module can perform what is illustrated, by way of example, as being performed on the first and second controller modules 36, 46.

The source 50 is in communication with the second remote server 40, providing the second remote server 40 with incoming data that can be in the form of the ARINC 424 or the DAFIF format. While illustrated as a single source, the source 50 can be any number of sources. That is, the second remote server 40 can receive incoming data in a variety of forms and from any number of sources. The source 50 or sources are in communication with the second remote server 40 using any suitable wired or wireless communication link.

Figure 2:
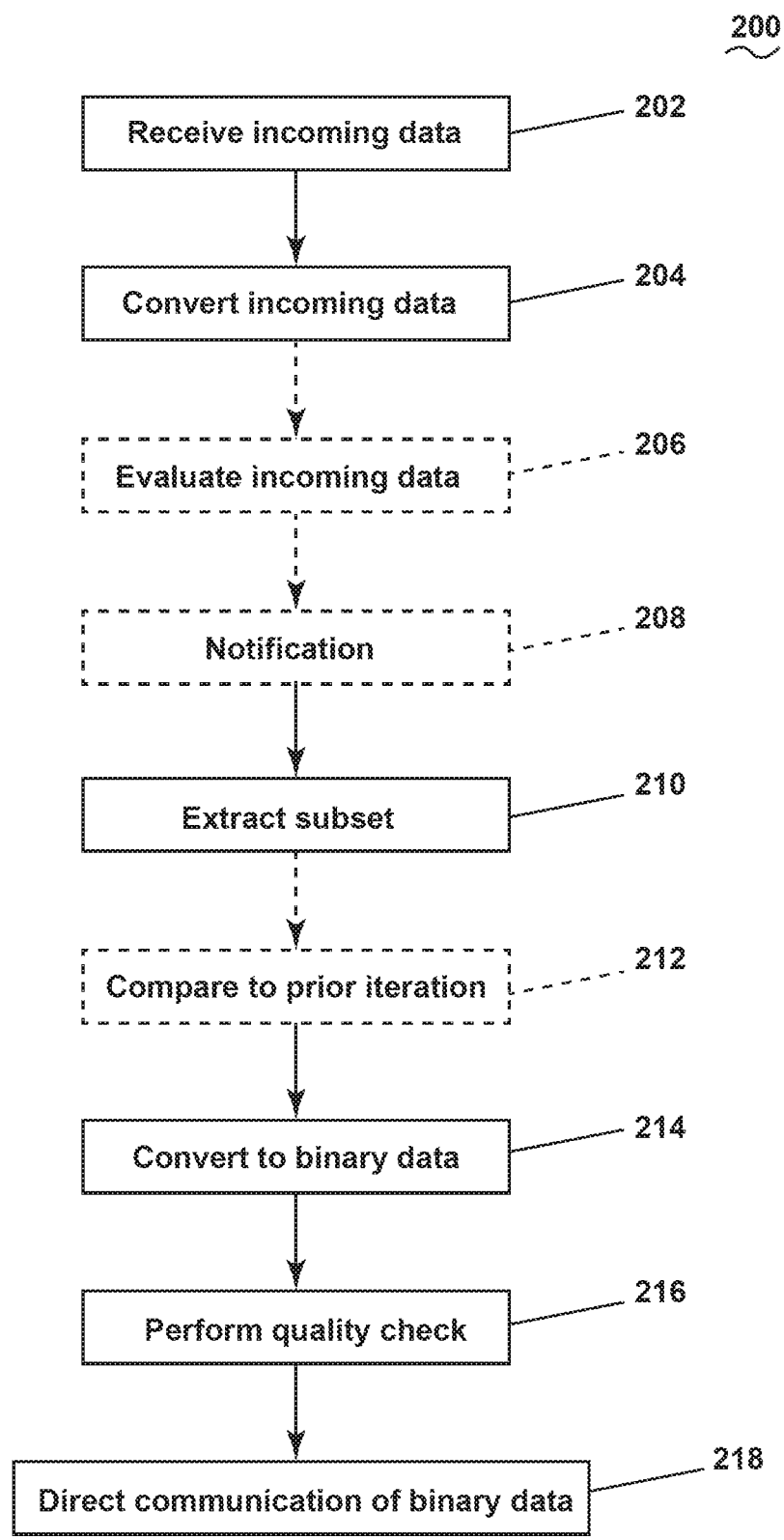
FIG. 2 is a flowchart showing a method for facilitating data communication, such as illustrated in FIG. 1, in accordance with various aspects described herein.

FIG. 2 illustrates a method 200 for facilitating data communication. At 202, the second controller module 46 receives incoming data from the source 50. The incoming data received by the second controller module 46 can include a plurality of records. Each record of the plurality of records can be related to one piece of navigation information or aviation data. The navigation information or aviation data can be one or more elements from a group of navigation information or aviation data. The group can include, but is not limited to, elements such as an airport, heliport, a runway, a waypoint, a navigational aid (navaid), an airway, an arrival route, and a departure route. Such incoming data can be from a variety of sources including, but not limited to, radio towers, satellite, wired connection with one or more data servers, or wireless connection with one or more data servers. Further, it is contemplated that the source 50 can be any provider that communicates aviation data, such as navigation data in ARINC 424 or DAFIF formats. It is further contemplated that the source and associated data can be certified by the relevant aviation authority or regulator, for example by receiving a Type 1 Letter of Acceptance indicating compliance with a specified standard, such as RTCA DO-200 (Standards for Processing Aeronautical Data).

By way of non-limiting example, the incoming data can be received in the ARINC 424 format. That is, the second controller module 46 can receive aviation data in a file format defined by the ARINC 424 format. ARINC 424 format is in a 132-character fixed-length format or Extensible Markup Language (XML) format. Additionally, or alternatively, the incoming data from the source 50 can be an NGA-authorized Digital Aeronautical Flight Information File (DAFIF). While incoming data is described as in the ARINC 424 or the DAFIF format, it is contemplated that the incoming data from the source 50 can be received in a variety of different formats. The second controller module 46 can receive the incoming data through one or more of a wired or wireless connection.

Optionally, at 204, the incoming data can be converted to an intermediate format that is distinct from the original incoming data format. That is, the incoming data can be converted to an intermediate format that is distinct from the ARINC 424 and the DAFIF format. Further, the intermediate format to which the incoming data is converted, can be distinct from a binary format.

Once in the intermediate format, at 206, the incoming data can optionally be evaluated by the second controller module 46 based on at least one of a content, a type, or a fidelity of the incoming data. By way of non-limiting example, the incoming data can be evaluated using independent field checks, interrelated field checks, interrelated record checks, or support data checks. Independent field checks can be a check to ensure the data in each independent field is within a predetermined range for that specified independent field. By way of non-limiting example, the acceptable range of the elevation of an airport could have a predetermined range of −1250 feet (381 meters below sea level) to 15,000 feet (4572 meters above sea level). By way of example, in such an independent field check, if the elevation of an airport was in the data record as 20,000 feet (6096 meters), it would be flagged as being invalid.

The interrelated field check is a check between one or more fields in the same record. By way of non-limiting example, on an Airport X record, if a speed limit is provided, then a speed limit altitude must also be provided. The interrelated field check notes the presence of a value for the speed limit, then checks to make sure there is also a value for the speed limit altitude. If the speed limit altitude is missing when the speed limit is provided, the field from which the speed limit altitude is missing will be flagged as missing or invalid.

The interrelated record check is used to check the sequencing of records or to check for the presence of records. Interrelated record checks can occur on complex data types, such as, but not limited to, approaches. By way of non-limiting example, if one Approach Leg record is marked as a Final Approach Course Fix (FACF), that record needs to occur sequentially before the Approach Leg record marked as the Final Approach Fix (FAF). The interrelated record check will flag a record found out of sequence or provide a flag for missing records when other sequential records are present.

The support data check can check for the presence of other data referred to by a first record. By way of non-limiting example, an Approach Y record refers to a waypoint and a runway. The support data check ensures that the data for the waypoint and the runway referenced by the Approach Y record exists in the database. If the waypoint data is missing, the support data check will flag the waypoint field in the Approach Y record, indicating that the supporting data for the waypoint is missing or invalid.

Flagged fields or records of the incoming data can be rectified or reconciled using an interactive editor. Flagged fields or records must be reconciled or reconciled before a notification at 208 is provided by the second controller module 46. The notification can indicate that the incoming data is validated or that the incoming data has been corrected or is correct. Optionally, during reconciliation, the source 50 of the incoming data is provided a report of the flagged fields or records. The flagged fields or records communicated to the source 50 can indicate to the source 50 which fields or records need to be corrected.

Optionally, data from more than one source can be combined. By way of non-limiting example, the DAFIF source can provide information regarding Airport A, Airport B, and Airport C. The ARINC 424 source can include information about Airport A, Airport B, and Airport D. Combining the information in the intermediate format allows for the information for Airport A, Airport B, Airport C, and Airport D to be available and not duplicated.

At 210, the second controller module 46 extracts a subset of the incoming data based on a set of predetermined parameters. By way of non-limiting example, the predetermined parameters for Airline X can be a list of countries. The list of countries selected as the predetermined parameters can be the countries that aircraft from Airline X travels through, near, lands at or takes off from. That is, the subset of the incoming data extracted for Airline X can be determined by countries selected by Airline X, so that incoming data related to counties that do not impact the flight path of aircraft from Airline X can be excluded. It is contemplated that any number of subsets of the incoming data can be extracted based on one or more parameters. Non-limiting examples of predetermined parameters can include any one or more International Civil Aviation Organization (ICAO) codes, country, region, flight plan, model of aircraft, model of engine, specific airports, specific approaches or departures, types of approaches or departures, geographic latitude or longitude boundaries for the inclusion or exclusion of airways, hold patterns, very high frequency (VHF) navigational aid (navaids), enroute waypoints, enroute non-directional beacons, minimum off route altitudes, runway surface types, standard instrument departures, terminal non-directional beacons, and terminal waypoints.

Optionally, at 212, the second controller module 46 can compare the subset of incoming data to a prior iteration. For instance, if the subset of incoming data is for an NDB that has a predetermined update cycle such as 28 days, the subset can be compared to the last cycle of data or a subset thereof. By way of non-limiting example, a first subset or subset from a prior iteration or cycle can be extracted from first incoming data using predetermined parameters. A second subset or a later subset can be extracted from second incoming data using the same or at least partially the same predetermined parameters used to extract the first subset from the first incoming data. The second controller module 46 can then compare the first subset to the second subset using a comparison tool. By way of non-limiting example, the comparing of the first subset and second subset can include a predetermined statistical analysis. When at least one predetermined statistical analysis is satisfied, the second controller module 46 can validate the comparing of the first subset and the second subset. Optionally, fields and records in the second subset can be flagged based on the comparison between the first subset and the second subset. An interactive tool can be used to assess, change, revert, or otherwise amend flagged fields or records in the second subset. It is also contemplated that the outcomes of the statistical analysis can be displayed, for example, by the second display 48.

At 214, the first subset or the second subset, having satisfied at least one predetermined statistical analysis in the comparing, is converted to binary data according to a binary format. The binary format can, for example, have a 32-bit registry. However, the binary format to which the first or second subset can be converted can be any binary format including, but not limited to registry lengths of 8-bit, 16-bit, or 64-bit. It is contemplated that the first subset or the second subset can be in the ARINC or the intermediate format before the conversion to the binary format.

The conversion also includes a digital signature that is included in or with the binary data. The digital signature can be generated, for example, by a cryptographic hash function, public/private key authentication using symmetric or asymmetric encryption, or blockchain protocol, where a specialized data key for generating or reading the digital signature can be one or more specialized data keys. The digital signature verifies and provides a means of authentication for the binary data. For example, the digital signature provides verification that the binary data is from the second controller module 46. That is, a controller module receiving the binary data will be able to identify and verify the second controller module 46 as the provider of the binary data.

Further, the digital signature can also include a database identification (ID) number. That is, only a controller module with the database ID number matching the database ID number in the digital signature can access the binary data from the second controller module 46. The database ID number can provide a communication or verification to the second controller module 46 that the correct controller module received the binary data. It is contemplated that the database identification (ID) number can be vehicle-specific such as linked or related to a tail number of an aircraft, which is unique to that aircraft.

The first subset or the second subset are compressed into the binary data by the second controller module 46, using, for example a packing tool. Data in the first subset or the second subset is traced to a data quality requirement, where the data quality requirements are in a computer-readable format that contains the data quality requirements values. The data quality requirements can be airline dependent and define expectations related to data characteristics that ensure the suitability of data in the first subset or the second subset for a specific airline.

The packing tool uses the data quality requirements values contained in the computer-readable format to pack and verify the appropriate packing for the first subset or the second subset. Since the packing tool uses the data quality requirements values, this allows the type, number, or other associated aspects of the data quality requirements to change without having to modify the packing tool. Additionally, the packing tool can have the ability to parse the data quality requirements in the computer-readable format and view it as a stand-alone document. This ensures easy review and understanding of the data quality requirements by themselves.

The binary data is compressed by at least an order of magnitude as compared to the first subset or the second subset. In a non-limiting example, the binary data can be compressed three orders of magnitude as compared to the first subset or the second subset. In addition to the benefit of compression, the binary data includes retrieval information for improved access times over binary data without the retrieval information.

The binary data can include the first subset and the second subset. The packing tool can use the comparison tool to compare data from the first subset to the data of the second subset. By way of non-limiting example, data that is identified as a duplicate or the same in the first and second subsets can be packed once in the binary format and flagged as good for both cycles or subsets. Data that is identified as not a duplicate or different between the first subset and the second subset is packed twice and flagged as first subset only or second subset only.

At 216, the second controller module 46 performs a set of quality checks on the binary data. At least one of the set of quality checks includes automatically determining if the digital signature is satisfied. This can include, by way of non-limiting example, ensuring that the digital signature is correct and present in the binary data.

Optionally, at 216, the second controller module 46 can compare the binary data to a prior iteration of the binary data. By way of non-limiting example, a first binary data can be a prior iteration of the binary data that is converted from the first subset. That is, the first binary data can be created from a previous ARINC cycle. A second binary data can be converted from the first subset or the second subset. That is, the second binary data can be created from a current ARINC cycle. The second controller module 46 can then compare the first binary data to the second binary data using a comparison tool. By way of non-limiting example, the comparing of the first binary data and second binary data can include a predetermined statistical analysis. When at least one predetermined statistical analysis is satisfied, the second controller module 46 can complete the comparing of the first binary data and the second binary data.

At 218, the second controller module 46 can direct the communication of the binary data, having satisfied at least one predetermined statistical analysis in the comparing. That is, the second controller module 46 can output the binary data with the digital signature to an appropriate receiving node. The binary data can include any number of a set of navigation databases, where the binary data or each of the set of navigational databases includes the digital signature. By way of non-limiting example, an appropriate receiving node can be the first remote server 30 or an external data storage device.

Directing communication or output to an appropriate receiving node can include the wired or wireless transmission of the binary data, or the second binary data, or the set of navigational databases from the second remote server to another remote server or other external data storage/transmission devices, or any combinations thereof. It will also be understood that the particular type or method of communication is not critical to the disclosure, and later-developed wireless or wired communication methods are certainly contemplated as within the scope of the current disclosure.

The binary data can form a database for at least one given cycle for the FMS of the aircraft 10. That is, the binary data can provide the data and information required to build a flight plan and process that plan when airborne to the FMS NDB stored on the computer 22 of the aircraft 10 for the navigation of a cycle of operation of the aircraft 10.

Additionally, or alternatively, to the method 200, the first controller module 36 can receive incoming data defined by a predetermined aircraft-specific data standard such as ARINC 424 or DAFIF to define a first data set or the first subset. The first controller module 36 can further receive data quality requirements that define data characteristics for at least one of the FMSs or a predetermined airline. The first controller module 36 can convert the first subset according to the data quality requirements to form a second data set or the second subset representative of the data characteristics. The first controller module 36 can further validate the second subset according to the data quality requirements. In response to the validation of the second subset, the first controller module 36 can digitally authorize the second subset and direct the output of communication of the validated second subset.

Figure 3:
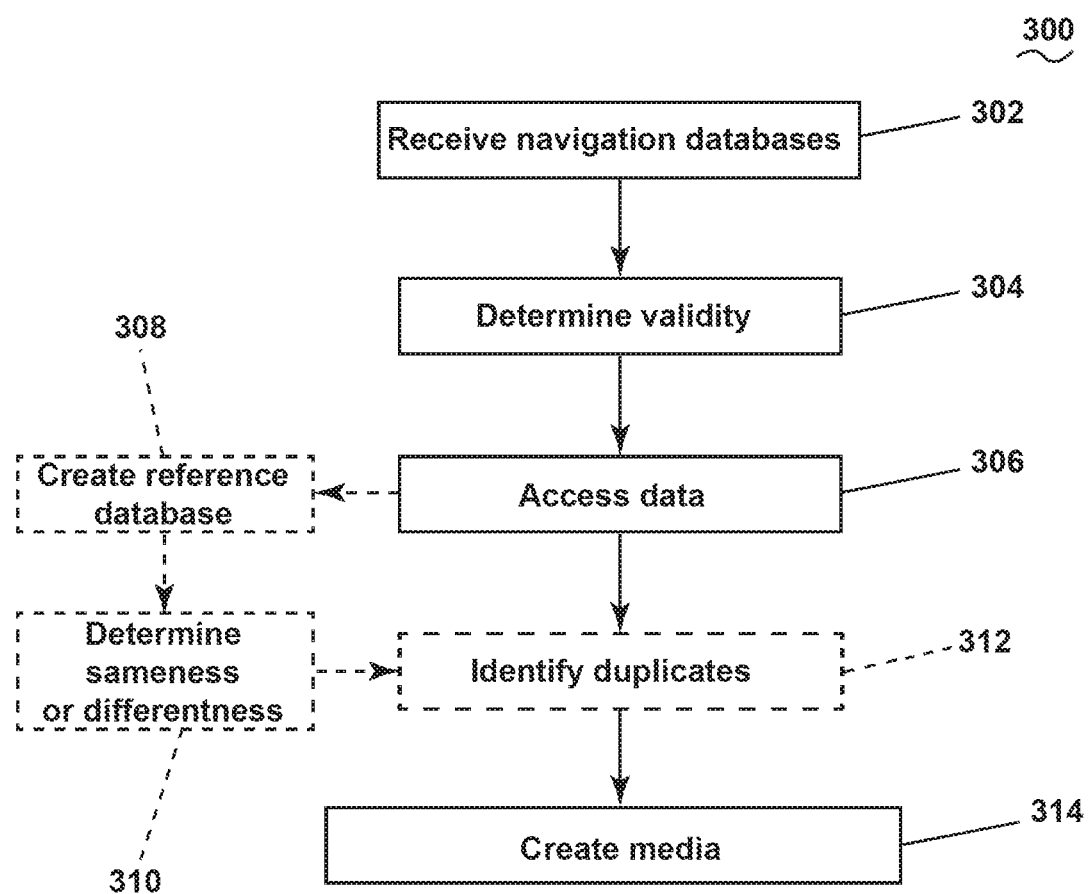
FIG. 3 illustrates a method of navigational database interaction.

FIG. 3 illustrates a method 300 of navigational database interaction. At 302, the binary data or the set of navigation databases is received by the first controller module 36 of the first remote server 30. It will be understood that this could also be accomplished by the same controller module as the method 200 or a different controller module as illustrated. It is contemplated that the set of navigation databases or binary data may be created by a first party in the method 200 and received by a second party in the method 300. However, it will be understood that this need not be the case. The term receiving can also mean loading, accessing, or otherwise presenting the set of navigations databases to the controller module.

At 304, the first controller module 36 can verify the digital signature for the binary data or for each navigation database of the set of navigational databases. The authentication or validity of the digital signature can be determined automatically by the first controller module 36. Alternatively, a user of the first remote server 30 can request the first controller module 36 to authenticate or verify the digital signatures. If the digital signature is not verified or is missing, the first controller module 36 will not open the data in the set of navigation databases.

Verification of the digital signature by the first controller module 36 can include a check of the digital signature to ensure that the provider of the binary data is the second controller module 46. If the binary data is in the correct format, but does not include the digital signature or if the digital signature does not correspond to the second controller module 46, communication of the missing or irregular digital signature can be provided to the user.

Verification of the digital signature can require checking the database identification (ID) number included in the digital signature of the binary data. That is, the first controller module 36 can only open the binary data if the database identification (ID) in the digital signature matches the database identification (ID) number of the first controller module 36.

Optionally, the first controller module 36 can communicate via the first display 38 to the user information related to the verification of the digital signature. That is, the first display 38 can communicate that the digital signature was verified, or that the digital signature was not verified. Further, details related to the digital signature not being verified can be provided by the first display 38. Additionally, or alternatively, the first controller module 36 or the user can communicate with one or more predetermined remote servers or individuals, including the second controller module 46, the verification or failure to verify the digital signature of the binary data received by the first controller module 36.

At 306, once the digital signature is verified, the first controller module 36 can access the data records of the database corresponding to the validated digital signature. That is, the data in the set of navigation databases can only be accessed by the first controller module 36 once the digital signature is validated. The first controller module 36 can use a tool, such as an interactive navigational database tool, to access the data records of the validated database. By way of non-limiting example, the interactive navigational database tool can browse, explore, review, inspect, or otherwise access, edit, organize, display, or convert the data or information in or related to the set of navigation databases. It is contemplated that the functions performed by the first controller module 36 can be, in fact, completed by the interactive navigational database tool loaded to the first controller module 36.

Access to the data in the set of navigational databases by the first controller module 36 can occur upon request or automatically in response to the digital signature verification. By way of non-limiting example, once the validity of the digital signature of each of the set of databases is confirmed, the first controller module 36 can begin processing or accessing the data within each navigational database of the set of navigational databases.

Once accessed, the first controller module 36 can allow the user of the first remote server 30 to browse navigational databases via the first display 38, directly view specific pieces of data in one or more selected navigational databases via the first display 38, or view selected properties of data in the navigational databases via the first display 38.

The set of navigational databases received by the first controller module 36 can include multiple disparate navigation databases. The multiple disparate navigation databases can by way of non-limiting example include at least two cycles of information for the FMS of the aircraft 10. That is, the set of navigational databases received at 302 can include one or more of the previous cycles or versions of the navigational database as well as the current cycle or newest version of the navigational database. Alternatively, the set of navigational databases received at 302 can include only the current cycle or newest version of the navigational database, while the one or more of the previous cycles or versions of the navigational database can be stored in the first remote server 30 and accessed by the first controller module 36.

Optionally at 308, a gold standard database or reference database is created. By way of non-limiting example, the reference database created at 308 is the current cycle or newest version of the reference database. Previous cycles or versions of the reference database can contain validated fields, records, or data from previously created reference databases. A reference database can be created for each navigational database of the set of navigational databases. Alternatively, two or more of the set of navigational databases can be used to create or maintain one or more reference databases. It is contemplated that multiple reference databases can be used to track different data types.

Optionally at 310, one of sameness or differentness can be determined between fields, records, or data of the current cycle or newest version of the reference database and one or more of the previous cycles or versions of the reference database. By way of non-limiting example, if the fields, records, or data in the current cycle or newest version of the reference database are the same as the previous cycle or within a predetermined range, then the fields, records, or data in the current or newest version of the reference database are designated with an indication of sameness. If the fields, records, or data in the current cycle or newest version of the reference database are different or outside a predetermined range from the fields, records, or data in the one or more of the previous cycles or versions, then the fields, records, or data in the current or newest version of the reference database is designated with an indication of differentness. The determination of the sameness or the differentness between the fields, records, or data can include determining an overall change statistic between the current cycle or newest version of the reference database and the one or more of the previous cycles or versions of the reference database.

An overall change statistic can be illustrated or communicated audially, graphically, or numerically on or by the first display 38. Additionally, or alternatively, the first display 38 can display or provide a side-by-side comparison of the fields, records, or data of the two or more cycles of the reference database with sameness or differentness indicated by highlighted fields, records, or data.

The first display 38 can allow the user to update or amend the reference database. The first controller module 36 allows the user to include historical information for a data record including at least user-provided comments and date stamp for entry updates.

Optionally, at 312, the first controller module 36 can automatically, or upon user request, identify duplicative or invalid instances of information in independent fields, interrelated fields, interrelated records, or support data from the set of navigation databases. The identification of the duplicative or the invalid instances of information can occur by the comparing of at least one field, record, or data between at least two cycles or multiple disparate navigational databases. That is, the duplicative or the invalid instances of information can be determined by the first controller module 36 recursively comparing one or more fields, records, or data of the at least two cycles.

The duplicative instances can be, by way of non-limiting example, data that is similar, identical, or includes sameness identification. The invalid instances can be, by way of non-limiting example, data that is different or includes a differentness indication.

Similar to 310, the comparing to identify the duplicative or the invalid instances at 312 can include determining one of a sameness or a differentness of the fields, records, or data in two or more cycles defining the multiple disparate navigation databases. By way of non-limiting example, if the fields, records, or data in the current cycle or newest version of the navigational database are the same as the previous cycle or within a predetermined range, then the fields, records, or data in the current or newest version of the navigational database are designated with an indication of sameness. If the fields, records, or data in the current cycle or newest version of the navigational database are different or outside a predetermined range from the fields, records, or data in the one or more of the previous cycles or versions, then the fields, records, or data in the current or newest version of the navigational database is designated with an indication of differentness. The determination of the sameness or the differentness between the fields, records, or data can include determining an overall change statistic between a first database and a second database or between the two different cycles in a single database.

An overall change statistic can be illustrated or communicated aurally, graphically, or numerically on or by the first display 38. Additionally, or alternatively, the first display 38 can display or provide a side-by-side comparison of the fields, records, or data of the multiple disparate navigation databases with differences indicated by highlighted fields, records, or data.

By way of non-limiting example, a final updated version of a navigational database can be a combination of multiple disparate navigation databases, where the information identified as the same is retained and not duplicated. For information identified as different, one of the two or more different data fields can be selectively chosen by the user or the controller module 36 to be included in the final updated version of the reference database.

Alternatively, the duplicative or the invalid instances identified by the first controller module 36 comparing the multiple disparate navigation databases can be deleted or removed, leaving the final updated version of the navigational database the selectively chosen data fields that were identified as different.

By further non-limiting example, a final updated version of the reference database can be a combination of multiple disparate reference databases, where the information identified as the same is retained and not duplicated. For information identified as different, one of the two or more different values can be selectively chosen by the user to include in the final updated version of the reference database.

At 314, the first controller module 36 can create aircraft loadable media for the FMS based on the set of navigation databases. Optionally, the aircraft loadable media for the FMS can be based, at least in part, on one or more reference databases. The aircraft loadable media can be in the format required by a specific FMS. It is contemplated that more than one format of aircraft loadable media can be created based on the same navigational database or reference database. The aircraft loadable media can be loaded to the external data storage device 31 for communication with the computer 22 of the aircraft 10. Alternatively, the aircraft loadable media can be communicated to the computer 22 via the ground station 32. By way of non-limiting example, the aircraft loadable media can update the FMS NDB housed in the computer 22 (FIG. 1).

Figure 4:
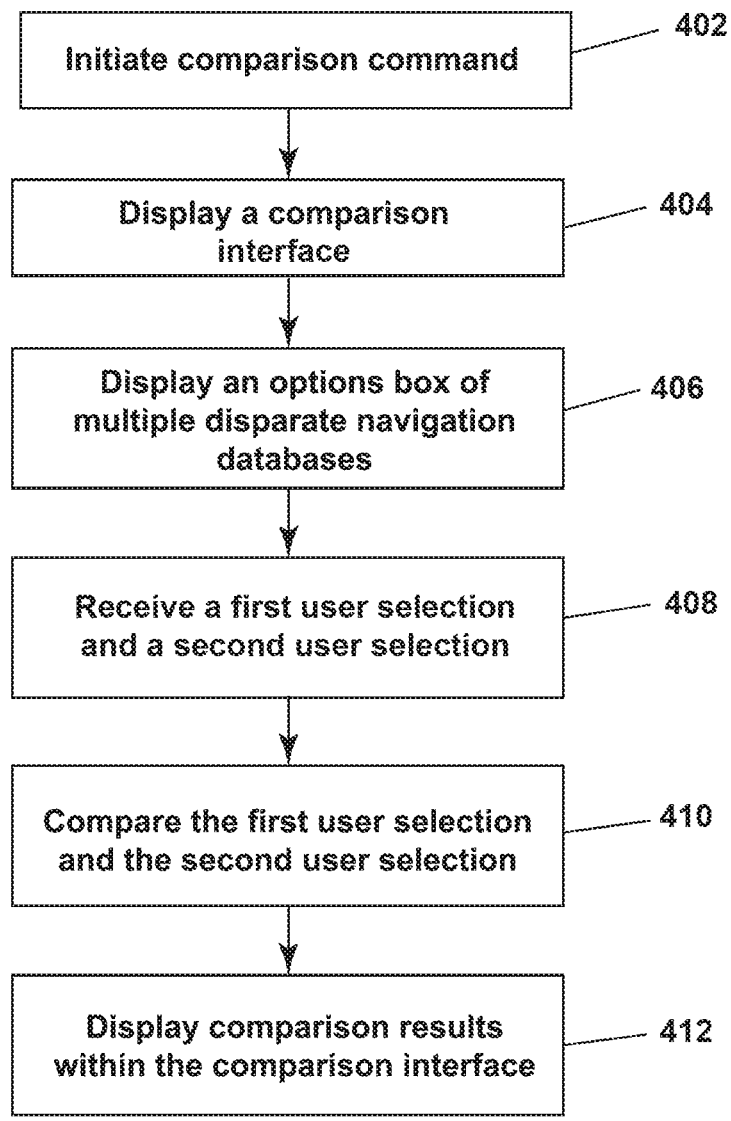
FIG. 4 illustrates another method of navigational database interaction.

FIG. 4 illustrates a method 400 for displaying navigation database information such as during the accessing data at 306 of method 300 or at 406 of method 400. At 402, the first control module 36 can optionally receive a signal or instruction command to initiate the comparison command. At 404, the first control module 36 displays the comparison interface 600 (non-limiting examples of the comparison interface 600 shown in FIGS. 6A-6B). The comparison interface 600 can display a home screen indicating the comparison command has initiated. The comparison interface can also have a data structure comprising a plurality of nodes and at least one child of each of the plurality of nodes. The comparison interface can also include at least one of an unchanged button, a changed button, a left only button, or a right only button. The user can select at least one of the unchanged button, the changed button, the left only button, or the right only button to customize the comparison interface 600 (as further described in FIGS. 7A and 7B).

Figure 5:
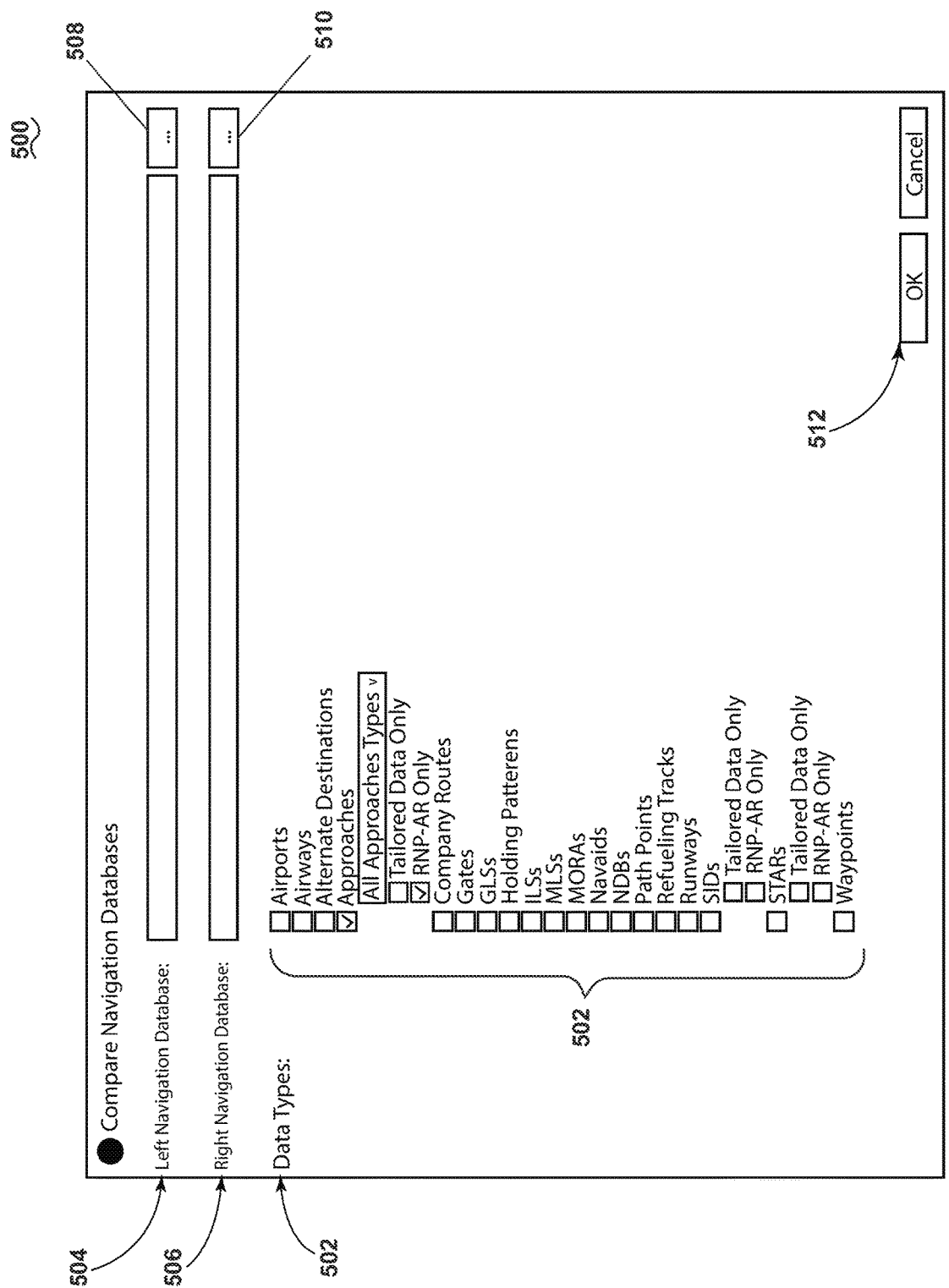
FIG. 5 illustrates an example of the option box within the comparison interface.

At 406, the first controller module 36 displays an options box, such as an options box 500 (as shown in FIG. 5). The options box 500 can have a data architecture for supporting integration of multiple disparate navigation databases. The multiple disparate navigation databases can comprise at least two cycles of information for a flight management system of an aircraft. Also, the multiple disparate navigation databases can be formatted in a binary database including a digital signature and further comprising automatically determining a validity of the digital signature before one of loading the information for displaying or the comparing. At 408, the first controller module 36 receives a first user selection and a second user selection within the options box 500 related to a first and second database of the multiple disparate navigation databases that differ.

At 410, the first control module 36 can further receive a signal prompting, instructing, or otherwise initiating a comparison, to occur within the comparison interface once the first and second databases are selected. The commanding comparison signal can be in the form of the user selecting a button within the options box 500 similar to a button 512 (as shown in FIG. 5). The first control module 36 can also automatically compare a first data set of the first database to a second data set in the second database eliminating the need for the user selecting a button within the options box 500.

Still referring to FIG. 4, at 412, the first control module 36 can display a comparison result within a new tab on the comparison interface. In another example, the first control module 36 can minimize the options box 500. Alternatively, the first control module 36 can close the options box 500. The comparison results can include a side-by-side comparison view, where the user can see at least one node and at least one child on the left-hand side, the results of the first database in the center, the results of the second database on the right. The benefit of the side-by-side view allows the user to view, on the one display screen, in one interface, the results of the first database and the second database, which correspond to the selected data types or at least one node 502 (as shown in FIG. 5) and the at least one child identified in the options box 500.

In another non-limiting example, the first controller module 36 can indicate at least one node and at least one child if the results of the first data base matches or differs from the second database. The indication can be illustrated on the first display 38, within the comparison interface 600, by highlighting and/or color coding the results of the respective databases, as further discussed with respect to FIG. 6B. The color coding can conform to the user preferences in the settings of the comparison interface within the home page. For example, the comparison results displayed in the side-by-side comparison view can also depict a tree-view of the plurality nodes and children of nodes as selected in the options box at 412. Each node and child of node can be indicated until the user selects the branch of the tree that matches or differs within the first and second databases or until the differentiating information is displayed down the tree-view.

Figure 6A:
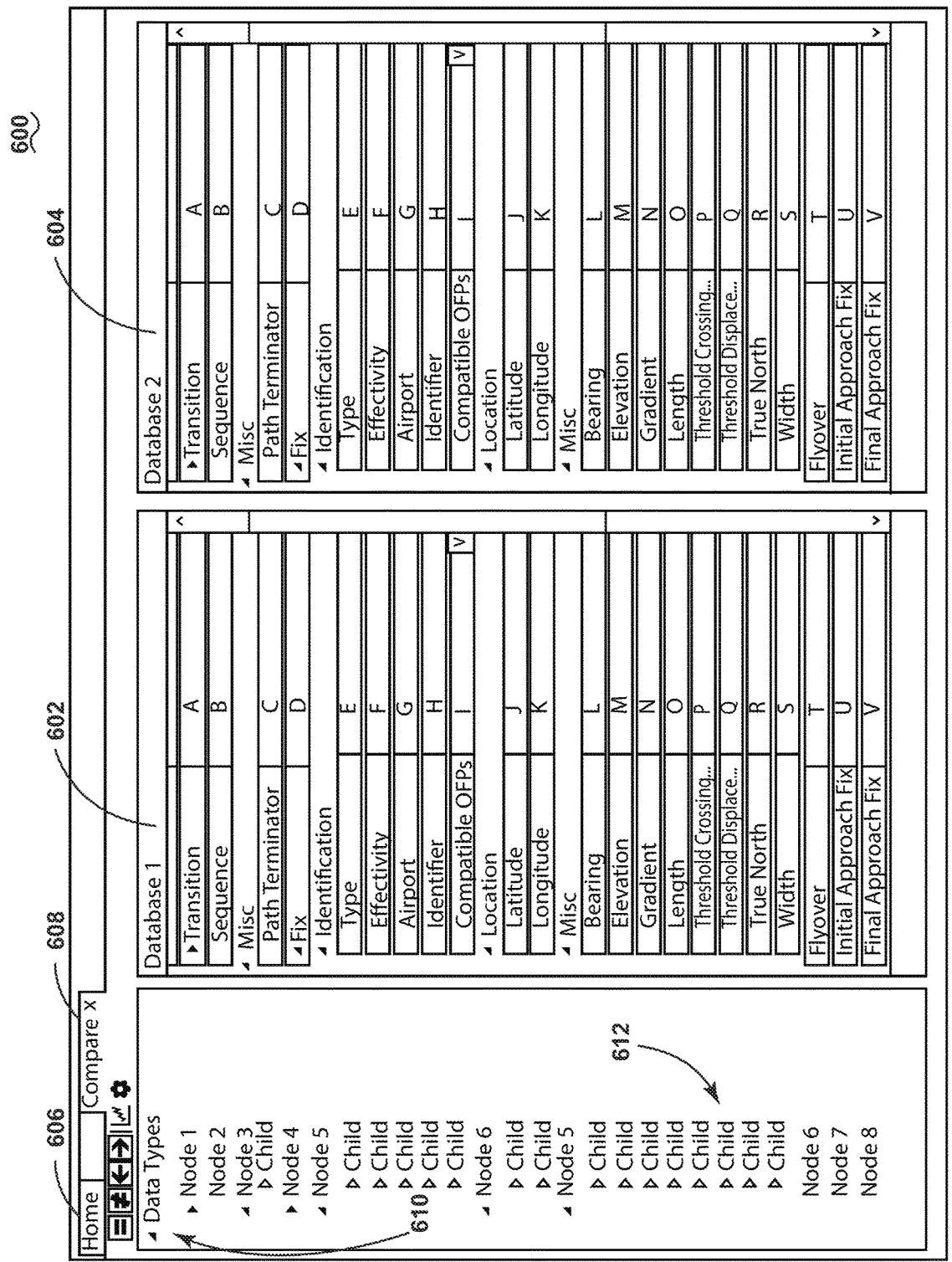
FIG. 6A illustrates the comparison results of the first database are the same in the comparison results in the second database.
Figure 6B:
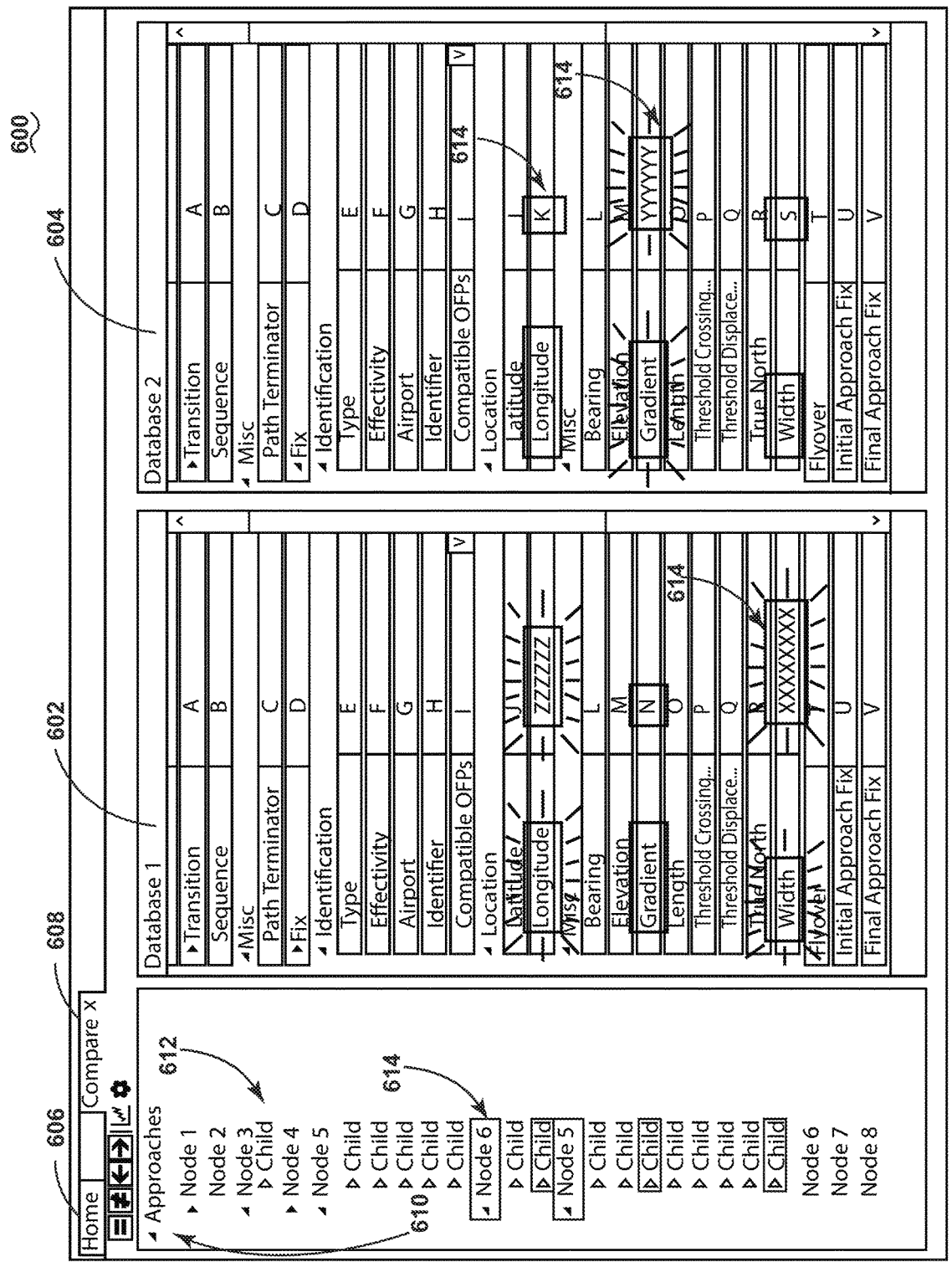
FIG. 6B illustrates the comparison results of the first database are different than the comparison results of the second database.

FIG. 5 illustrates an example of the option box 500 within the comparison interface 600 (as shown in FIGS. 6A-6B). The option box 500 can also be identified as a compare navigation databases box. The options box 500 illustrates the location of the first and second navigation databases, also illustrated as left and right navigation databases, respectively 504, 506. Each database 504, 506 can be changed by selecting user input buttons 508, 510, respectively.

In one example, the first controller module 36 can receive the signal prompting comparison to occur within the comparison interface automatically as two databases 504, 506, are loaded. In another example the option box can also include a plurality of data types 502, which filter out specified nodes 502 or data information from the first and second database 504, 506. The filtering outputs data information which correspond to the selected node 502 in the comparison results. An example of the specified node can pertain to information concerning airports, airways, alternate destinations, company routes, gates, path points, runways, waypoints, and any other flight management data information within the industry. The first controller module 36 (not shown) can output the comparison results with the selected information as the signal prompting comparison is received. The first controller module 36 can receive the signal prompting comparison via a button within options box 500 similar to the button 512.

For example, the first controller module 36 can allow the user to include historical information for a data record including at least user-provided comments and date stamp for entry updates. Another example, the first controller module 36 can allow the user to select at least one data type 502, which can be displayed on the first display 38 (for example, shown in FIG. 1). Once the first display 38 shows the comparison results within the comparison interface 600, data can be loaded onto the Aircraft Loadable Media (loadable media) 504. In another example, the first display 38 can show only one database without comparison between two databases.

FIGS. 6A-6B illustrate the comparison interface 600 displaying comparison results of the first database 602 and the second database 604, such as the first and second databases 504, 506 of FIG. 7. The comparison interface 600 can include a tabbed interface, including a home tab 606 and a compare tab 608. For example, the comparison interface 600 can display the home screen in response to the selection of the home tab 606 and hide the comparison tab 608. In another non-limited example, the comparison interface 600 can display the comparison results in response to the selection of the compare tab 608 and hide the home screen. The compare tab can display a plurality of nodes and children 610, 612. The nodes and children 610, 612 can correspond to the plurality of nodes or data types, 610, selected in options box 500.

FIG. 6A illustrates the comparison results of the first database 602 is the same in the comparison results in the second database 604. In contrast, FIG. 6B illustrates an example set of comparison results when the first database 602 differs from the comparison results of the second database 604. FIG. 6B also illustrates the different results of each of the first and second databases 602, 604, by including a set of indicator boxes 614 around each respective element that differs between the respective databases 602, 604 within the comparison interface.

In another non-limiting example, the indicating or indication that an element in the first database 602 differs from an element in the second database 604 can include indicating each element with a specified color, highlight, or solid box surrounding the indicated element. The specified colors can be customized to the user preference via the gear button 712

Figure 7A:
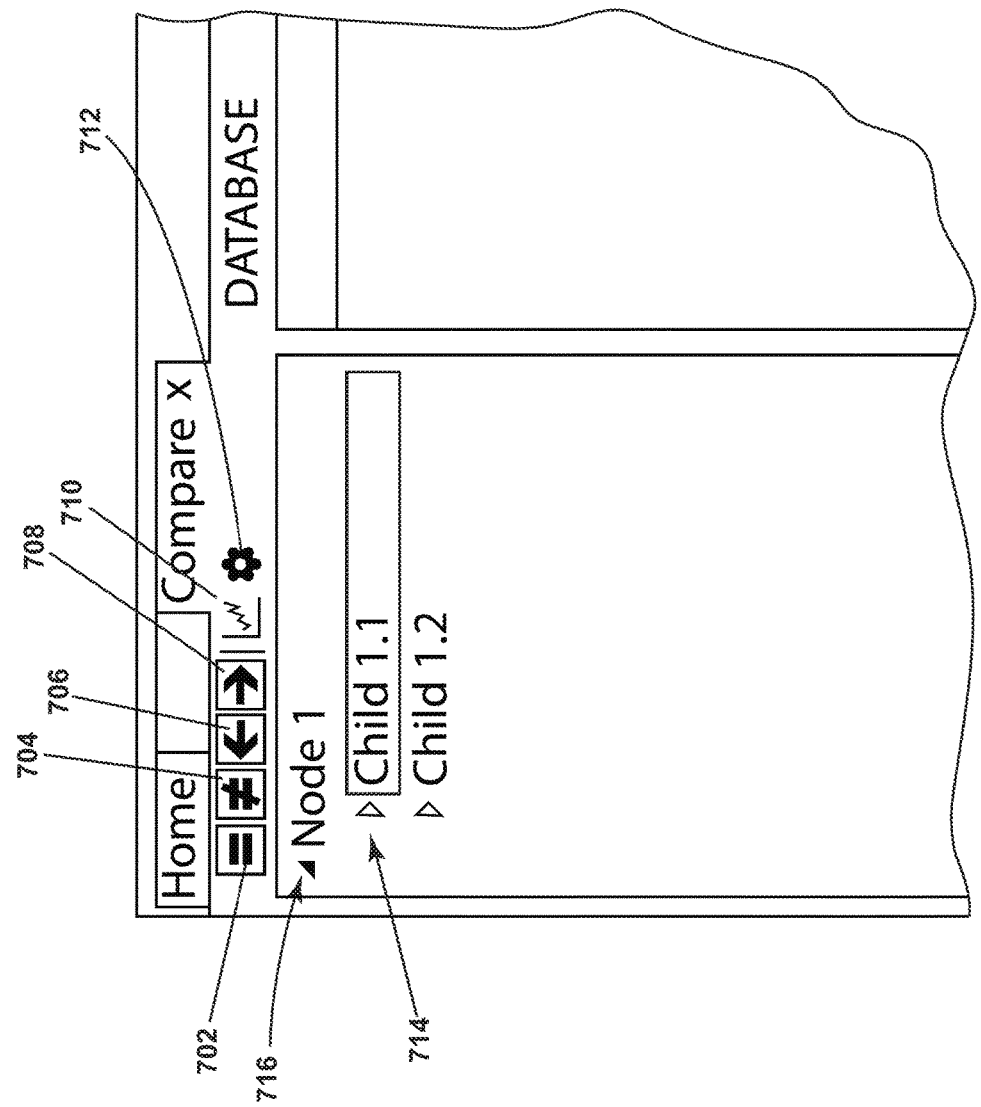
FIG. 7A illustrates a close-up of a portion of the comparison interface.
Figure 7B:
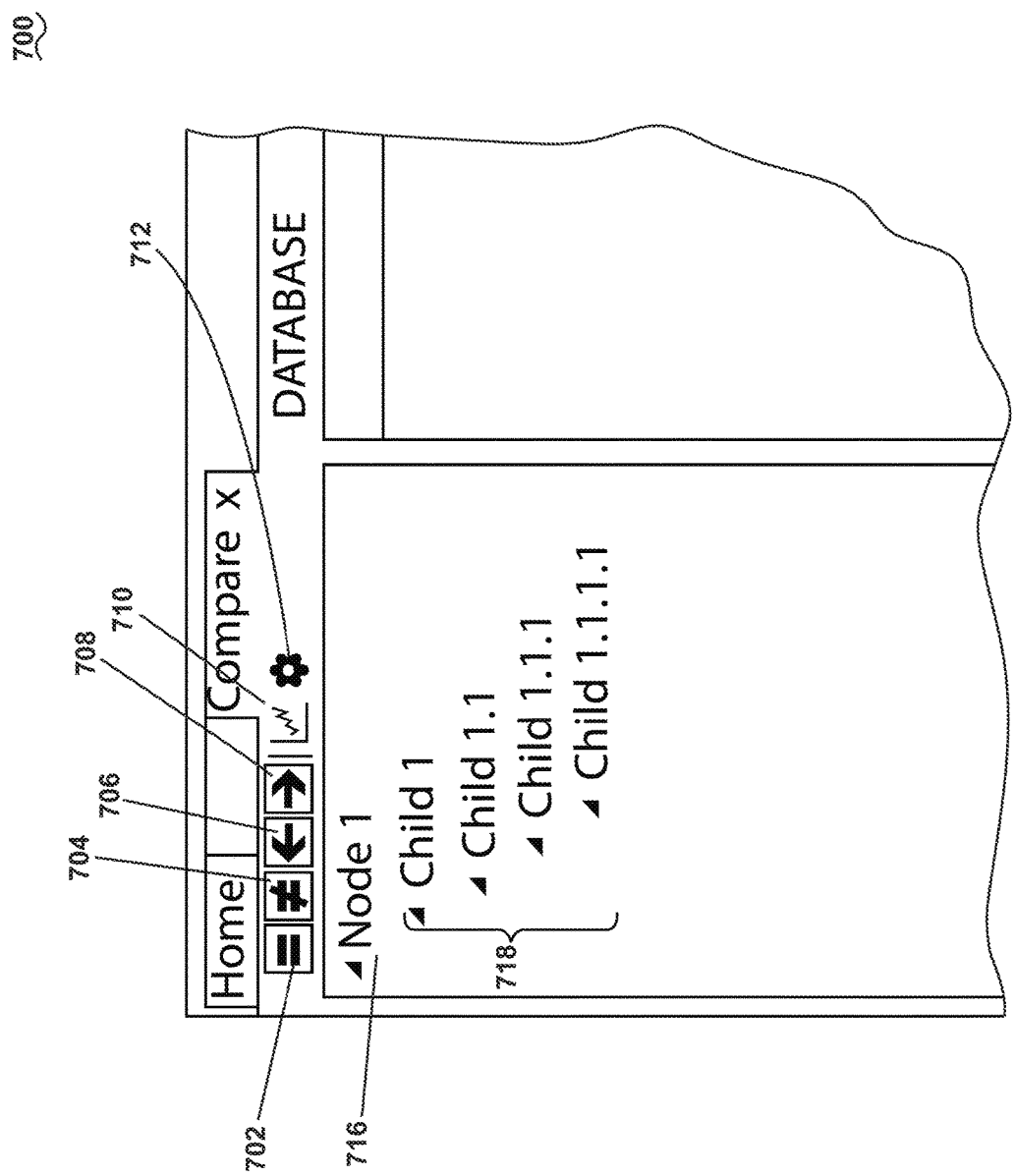
FIG. 7B illustrates another close-up of another portion of the comparison interface.

(as shown in FIGS. 7A-7B). In another non-limiting example, a plurality of indicator boxes 614 can be used to indicate matching data as well as mismatched data between each database 602, 604.

FIGS. 7A-7B illustrate a close-up or zoomed example portion 700 of the comparison interface 600 illustrated in FIGS. 6A-6B. The zoomed example portion 700 of the comparison interface 600 of FIGS. 7A-7B illustrates a plurality of buttons. Each button sends a signal to the first controller module 36 reflective of, or representing an optional display mode of the comparison results of each database. For example, a first display mode selection representative of, or indicative of an unchanged button or an equal sign button 702 can be selected displaying only the comparison results of the first database and the second database that are the same. Another example, a second display mode selection representative of, or indicative of a changed button or a non-equal sign button 704 can be selected displaying only the comparison results of the first database and the second database that are the different. Yet still another example, a third display mode selection representative of, or indicative viewing only the first database 602, the left arrow button 706 can be selected displaying only the comparison results of only the first database and hiding the results of the second database. It is contemplated that the buttons are not mutually exclusive. That is the user can select any combination of the buttons to display the comparison as desired. It is further contemplated that the buttons or additional buttons can be provided that are customizable.

Another example, a fourth display mode selection representative of, or indicative of viewing only the second database 604, the right arrow button 708 can be selected displaying the comparison results of only the second database and hiding the results of the first database. Furthermore, in another non-limiting example, the display mode preferences can be selected via a gear button 712, which can display a setting preference box. In some examples, the setting preference box can allow the user to manipulate how the indicator boxes appear within the display, e.g. color options, bolded box options, etc. of the comparison results. In another non-limited example, the gear button 712 can re-select the options discussed in FIG. 5 with respect to the options box.

Also, FIG. 7A illustrates an indicator box 714 surrounding a child of the node 716. The indicator box 714 can indicate the presence or absence of at least one of a matching element or an element that differs within that respective branch of the child of node 716 (e.g. "Child 1.1"). Again, an indicator can be identified by an indicator box 714 (as illustrated), highlighted, bolded, color-coded, etc. FIG. 7B illustrates another example of the zoomed example portion 700 of the comparison interface 600 wherein the tree-view of a node 716 and a plurality of children 718 without an indicator, that is, the absence of the indicator box 714 indicating there are no differing element data.

Figure 7C:
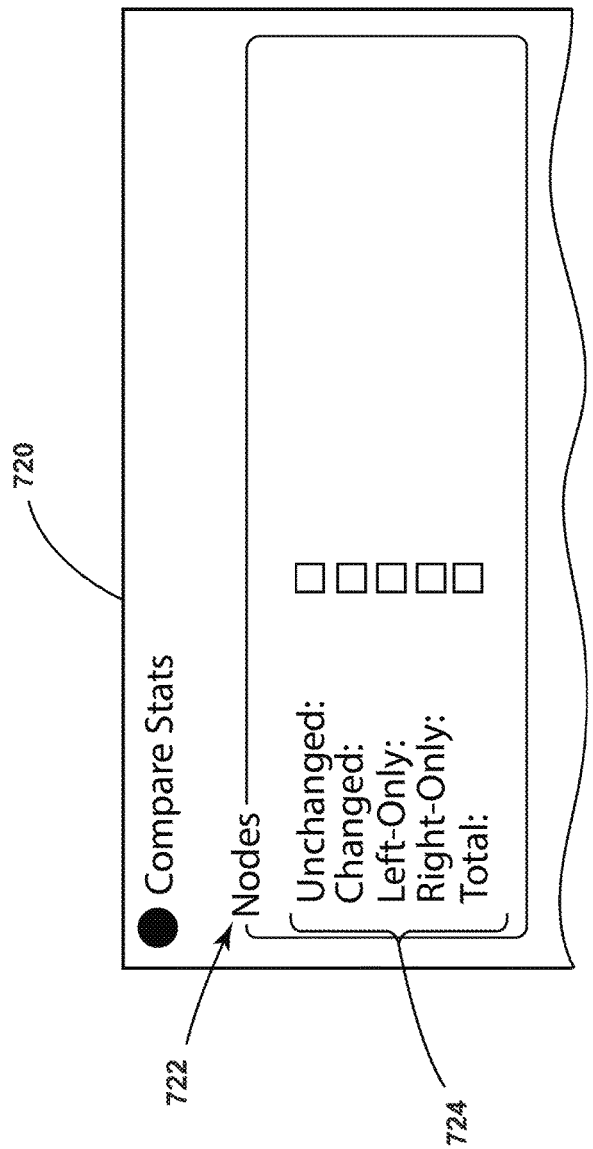
FIG. 7C illustrates a statistical summary of the comparison results.

FIG. 7C illustrates another display mode selection representative of, or indicative of a line graph button 710 can be selected for operably displaying the statistical summary of the comparison results. The statistical summary or compare stats 720 can gather information of a plurality of nodes 722 within the comparison results and output statistical data 724 such as a numbered amount or a percentage amount of unchanged nodes, changed nodes, left only nodes, right only nodes, and a total amount of nodes.

The aspects disclosed herein provide a method for facilitating data communication. The technical effect is that the above described aspects enable the user to quickly identify similarities and differences in data between two databases. One advantage associated with the disclosure discussed herein can include, but are not limited to, the intuitive side-by-side comparison of multiple databases.

Additional benefits include using one or both of the DAFIF and ARINC 424 data and transferring them to an intermediate form where the controller module can further analyze data or convert the incoming data to the set of navigational databases in the binary form. The conversion to the binary format or the set of navigational databases uses the data quality requirements as indexes, allowing for quick reporting or viewing according to the data quality requirements.

Further, benefits include checking and digitally signing the binary data or each of the set of navigational databases to ensure accuracy and authenticity before communicating. The digital signature can then be verified by the one or more controller modules that receive the binary data or each of the set of navigational databases. A benefit of this is that a vehicle or FMS can detect a counterfeit database or hacked database which does not have a valid signature. Further still, a tail number for the aircraft can be associated with the database so it can be determined that the database went to the appropriate aircraft.

The interactive navigational database tool that receives the binary data or each of the set of navigational databases on the controller module can provide output data to another database, generate a gold standard or reference database, as well as create aircraft media in the required form of the FMS NDB.

Additional benefits include quickly identifying data that has been added, removed, or changed in an intuitive side-by-side comparison. Some other added benefits of this system are the capability of tailoring the data and validating required navigation performance (RNP) with authorization required (AR) procedures, simple monitoring of navigation data, enabling efficient procedure validation, and the ability to maintain a detailed history of every record.

Additional benefits include the capability to split loadable binary NDBs into load sets that support ARINC 615-3 loading, ARINC 615A loading, loading from floppy disk or diskettes, loading directly from a hard drive, loading from portable memory devices, loading over ARINC 429 and loading via ethernet.

Further the interactive navigational database tool allows a user to browse the entire contents of the NDB and search for specific contents within the NDB. The interactive navigational database tool can expand and explore references to multiple databases with an industry-standard format as well as export a binary NDB to an industry-standard format allowing users to develop their own specialized tool set.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects of the disclosure are provided by the subject matter of the following clauses:

A method for facilitating data communication that comprises receiving, with a controller module, incoming data related to operation of an aircraft, extracting, with the controller module, a subset of the incoming data based on a set of predetermined parameters, converting, with the controller module, the subset of the incoming data to binary data according to a binary format and including a digital signature on the binary data, performing, with the controller module, a set of quality checks on the binary data according to the binary format and wherein at least one of the set of quality checks includes automatically determining if the digital signature is satisfied, and directing, the output of communication of the binary data.

The method of any of the preceding clauses, further comprising converting, with the controller module, the incoming data into an intermediate format distinct from the format of the incoming data and the binary format.

The method of any of the preceding clauses, further comprising evaluating, with the controller module, at least one of a content, a type, and a fidelity of the incoming data prior to extracting.

The method of any of the preceding clauses wherein the evaluating comprises at least two of the group of: independent field checks, interrelated field checks, interrelated record checks, and support data checks.

The method of any of the preceding clauses, further comprising providing a notification related to the evaluating and wherein the incoming data is one of validated or corrected prior to extracting.

The method of any of the preceding clauses wherein the binary data is compressed by an order of magnitude as compared to the subset.

The method of any of the preceding clauses wherein the converting to the binary data according to the binary format further comprises providing retrieval information for improved access over the binary data without the retrieval information.

The method of any of the preceding clauses wherein the controller module compares the subset of the incoming data to a prior iteration of the subset of the incoming data and converting to the binary data occurs when at least one predetermined statistical analysis is satisfied in the comparing.

The method of any of the preceding clauses wherein the at least one set of the quality checks includes comparing the binary data to a prior iteration of the binary data and directing occurs when at least one predetermined statistical analysis is satisfied by the comparing.

The method of any of the preceding clauses wherein the incoming data includes a plurality of records, each record of the plurality of records related to one piece of navigation information from a group including: an airport, a runway, a waypoint, a navaid, an airway, an arrival route, and a departure route.

The method of any of the preceding clauses wherein the binary data forms a database for at least one given cycle for a flight management system of an aircraft.

A system for compiling and converting Aeronautical Radio Incorporated (ARINC) 424 or Digital Aeronautical Flight Information File (DAFIF) files into a binary database, a controller module configured to receive incoming data in Aeronautical Radio Incorporated (ARINC) 424 format or Digital Aeronautical Flight Information File (DAFIF) format, extract a subset of the incoming data based on a set of predetermined parameters, convert the subset of the incoming data to binary data according to a binary format and including a digital signature on the binary data, perform a set of quality checks on the binary data according to the binary format and wherein at least one of the set of quality checks includes automatically determining if the digital signature is satisfied, and direct the output of communication of the binary data.

The system of any of the preceding clauses, wherein the controller module further converts the incoming data into an intermediate format distinct from the ARINC 424 format, the DAFIF format, and the binary format.

The system of any of the preceding clauses, wherein the controller module further evaluates the at least one of a content, a type, and a fidelity of the incoming data in the intermediate format prior to extracting a subset of the incoming data.

The system of any of the preceding clauses wherein the evaluating comprises at least two of the group of: independent field checks, interrelated field checks, interrelated record checks, and support data checks.

The system of any of the preceding clauses, wherein the controller module further provides a notification related to the evaluating and wherein the incoming data is one of validated or corrected prior to extracting.

The system of any of the preceding clauses wherein during the conversion to the binary format, the controller module further provides retrieval information for improved access over the binary data without the retrieval information.

The system of any of the preceding clauses wherein the controller module compares the subset of the incoming data to a prior iteration of the subset of the incoming data and converting to the binary data occurs when at least one predetermined statistical analysis is satisfied in the comparing.

The system of any of the preceding clauses wherein the at least one set of the quality checks by the controller module includes comparing the binary data to a prior iteration of the binary data and directing occurs when at least one predetermined statistical analysis is satisfied by the comparing.

The system of any of the preceding clauses wherein the incoming data includes a plurality of records, each record of the plurality of records related to one piece of navigation information from a group including: an airport, a runway, a waypoint, a navaid, an airway, an arrival route, and a departure route.

What is claimed is:

1. A method for facilitating data communication, comprising:
    receiving, with a controller module, incoming data related to operation of an aircraft;
    converting, with the controller module, the incoming data to an intermediate format data;
    evaluating, with the controller module, a validity of the intermediate format data;
    extracting, with the controller module, a subset of the converted intermediate format data based on a set of predetermined parameters;
    comparing, with the controller module, the subset of the converted intermediate format data to a prior iteration of the converted intermediate format data;
    upon determining that: the intermediate format data is valid based on the evaluating; and at least first one predetermined statically analysis is satisfied based on the comparing the subset, converting, with the controller module, the intermediate format data to binary data according to a binary format and including a digital signature on the binary data;
    performing, with the controller module, a plurality of quality checks on the binary data according to the binary format and wherein at least one quality check of the plurality of quality checks includes automatically determining if the digital signature is satisfied; and directing, with the controller module, an output of communication of the binary data.

2. The method of claim 1, wherein a format of the intermediate format data is distinct from a format of the incoming data and the binary format.

3. The method of claim 2, further comprising evaluating, with the controller module, at least one of a content, a type, or a fidelity of the intermediate format data prior to the extracting.

4. The method of claim 3, wherein the evaluating at least one of the content, the type, or the fidelity of the intermediate format data further comprises evaluating at least two of a group of: independent field checks, interrelated field checks, interrelated record checks, and support data checks.

5. The method of claim 4, further comprising providing a notification related to the evaluating at least two of the group of: independent field checks, interrelated field checks, interrelated record checks, and support data checks, and wherein the incoming data is one of validated or corrected prior to the extracting.

6. The method of claim 2, wherein the binary data is compressed by an order of magnitude as compared to the subset.

7. The method of claim 1, wherein the converting to the binary data according to the binary format further comprises providing retrieval information for improved access over the binary data without the retrieval information.

8. The method of claim 1, wherein the at least one quality check of the plurality of the quality checks includes comparing the binary data to a prior iteration of the binary data and the directing occurs when at least one second predetermined statistical analysis is satisfied by the comparing the binary data.

9. The method of claim 1, wherein the incoming data includes a plurality of records, each record of the plurality of records related to one piece of navigation information from a group including: an airport, a runway, a waypoint, a navaid, an airway, an arrival route, and a departure route.

10. The method of claim 1, wherein the binary data forms a database for at least one given cycle for a flight management system of an aircraft.

11. A system for compiling and converting Aeronautical Radio Incorporated (ARINC) 424 or Digital Aeronautical Flight Information File (DAFIF) files into a binary database, comprising:

a memory; and a controller module configured to:

receive incoming data in Aeronautical Radio Incorporated (ARINC) 424 format or Digital Aeronautical Flight Information File (DAFIF) format;

convert the incoming data to an intermediate format data;

evaluate a validity of the intermediate format data;

extract a subset of the converted intermediate format data based on a set of predetermined parameters;

compare the subset of the converted intermediate format data to a prior iteration of the converted intermediate format data;

upon determining that: the intermediate format data is valid based on the evaluation; and at least one first predetermined statically analysis is satisfied based on the comparing the subset, convert the intermediate format data to binary data according to a binary format and including a digital signature on the binary data;

perform a set of quality checks on the binary data according to the binary format, wherein the set of quality checks include automatically determining if the digital signature is satisfied, and comparing the binary data to a prior iteration of the binary data; and direct an output of communication of the binary data when at least one second predetermined statistical analysis is satisfied by the comparing the binary data to the prior iteration of the binary data.

12. The system of claim 11, wherein a format of the intermediate format data is distinct from a format of the incoming format data and the binary format.

13. The system of claim 12, wherein the controller module further evaluates the at least one of a content, a type, or a fidelity of the intermediate format data prior to the extracting.

14. The system of claim 13, wherein the evaluating at least one of the content, the type, or the fidelity of the intermediate format data comprises at least two of a group of a group of: independent field checks, interrelated field checks, interrelated record checks, and support data checks.

15. The system of claim 14, wherein the controller module further provides a notification related to the evaluating at least two of the group of: independent field checks, interrelated field checks, interrelated record checks, and support data checks and wherein the incoming data is one of validated or corrected prior to the extracting.

16. The system of claim 11, wherein during the conversion to the binary format, the controller module further provides retrieval information for improved access over the binary data without the retrieval information.

17. The system of claim 11, wherein the incoming data includes a plurality of records, each record of the plurality of records related to one piece of navigation information from a group including: an airport, a runway, a waypoint, a navaid, an airway, an arrival route, and a departure route.

* * * * *